(12) United States Patent
Zhu et al.

(10) Patent No.: US 10,946,529 B2
(45) Date of Patent: Mar. 16, 2021

(54) METHOD AND DEVICE FOR CHARGING SERVICE ROBOT AND SERVICE ROBOT

(71) Applicant: Goertek Inc., Weifang (CN)

(72) Inventors: Jian Zhu, Weifang (CN); Xiangdong Zhang, Weifang (CN); Zhenyu Yu, Weifang (CN); Zhiping Luo, Weifang (CN); Dong Yan, Weifang (CN)

(73) Assignee: GOERTEK INC., Weifang (CN)

( * ) Notice: Subject to any disclaimer, the term of this patent is extended or adjusted under 35 U.S.C. 154(b) by 276 days.

(21) Appl. No.: 16/097,739

(22) PCT Filed: May 23, 2018

(86) PCT No.: PCT/CN2018/088061
§ 371 (c)(1),
(2) Date: Oct. 30, 2018

(87) PCT Pub. No.: WO2019/062164
PCT Pub. Date: Apr. 4, 2019

(65) Prior Publication Data
US 2020/0180161 A1    Jun. 11, 2020

(30) Foreign Application Priority Data

Sep. 27, 2017   (CN) .......................... 201710890444.0

(51) Int. Cl.
*B25J 13/08*       (2006.01)
*B25J 13/00*       (2006.01)
(Continued)

(52) U.S. Cl.
CPC ........... *B25J 13/003* (2013.01); *B25J 9/1674* (2013.01); *B25J 9/1679* (2013.01); *B25J 9/1694* (2013.01);
(Continued)

(58) Field of Classification Search
CPC ...... B25J 13/003; B25J 11/008; B25J 19/026; B25J 19/0066; B25J 9/1679; B25J 9/1694;
(Continued)

(56) References Cited

U.S. PATENT DOCUMENTS 9,215,957 B2 * 12/2015 Cohen ................... G01S 1/7038
10,775,803 B2 *  9/2020 Fici ....................... G05D 1/0282
(Continued)

FOREIGN PATENT DOCUMENTS

CN          204129525 U    1/2015
CN          106324603 A    1/2017
(Continued)

*Primary Examiner* — Dalena Tran
(74) *Attorney, Agent, or Firm* — Fox Rothschild LLP; Carol E. Thorstad-Forsyth (57) ABSTRACT

A method for charging a service robot and a service robot are disclosed. The method comprises: collecting an audio signal generated by a sound source of a charging pile; determining a direction of the sound source according to the collected audio signal; controlling a robot main body to move toward the direction of the sound source, to shorten a distance between the robot main body and the charging pile; judging whether the infrared receiver array has received an infrared pulse signal emitted by the infrared emitter array of the charging pile; and when the infrared receiver array has received the infrared pulse signal, controlling the robot main body to move toward a direction of the charging pile according to the infrared pulse signal, to engage a charging component of the robot main body with a charging contact element of the charging pile.

17 Claims, 5 Drawing Sheets

(51) Int. Cl.
    *B25J 9/16*           (2006.01)
    *B25J 11/00*         (2006.01)
    *B25J 19/00*         (2006.01)
    *B25J 19/02*         (2006.01)

(52) U.S. Cl.
    CPC ......... *B25J 11/008* (2013.01); *B25J 19/0066* (2013.01); *B25J 19/026* (2013.01)

(58) Field of Classification Search
    CPC ... B25J 9/1674; G05D 1/0225; G05D 1/0231; G05D 1/0276; G05D 1/02; A47L 2201/022; A47L 2201/02; A47L 2201/04; A47L 9/2873
    USPC ...................................... 700/245; 318/568.12
    See application file for complete search history.

(56) References Cited

U.S. PATENT DOCUMENTS

| | | | |
|---|---|---|---|
| 2004/0158354 A1* | 8/2004 | Lee ........................ | G05D 1/027 700/245 |
| 2004/0204804 A1* | 10/2004 | Lee ..................... | G05D 1/0219 701/23 |
| 2017/0123433 A1 | 5/2017 | Chiappetta | |

FOREIGN PATENT DOCUMENTS

| | | |
|---|---|---|
| CN | 107064876 A | 8/2017 |
| CN | 107685334 A | 2/2018 |
| CN | 207448485 U | 6/2018 |
| JP | 2017063968 A | 4/2017 |

* cited by examiner

METHOD AND DEVICE FOR CHARGING SERVICE ROBOT AND SERVICE ROBOT

CROSS REFERENCE TO RELATED APPLICATIONS

This application is a U.S. National Stage entry under 35 U.S.C. § 371 based on International Application No. PCT/CN2018/088061, filed on May 23, 2018, which was published under PCT Article 21(2) and which claims priority to Chinese Patent Application No. 201710890444.0, filed on Sep. 27, 2017. The disclosure of the priority applications are hereby incorporated herein in their entirety by reference.

TECHNICAL FIELD

The present disclosure relates to the technical field of robots, and more particularly to a method and device for charging a service robot and a service robot.

BACKGROUND

Along with the maturing of robotic technology, industrial robots have been extensively used to replace workers in plants and improve production efficiency and accuracy. In the civil field, service robots provide users various services such as reception and meal delivering. The most typical service robot is floor-sweeping robots, which help the user clean house.

A floor-sweeping robot comprises a robot main body and a charging pile. In practical applications, the floor-sweeping robot moves in a room to do the cleaning, and the charging pile is fixed. When the floor-sweeping robot determines that its electric quantity is below a preset threshold, it returns to the charging pile by means of navigation techniques and is charged.

There are many robot charging solutions, but the conventional solutions all have the problems of high cost and poor practicability.

Particularly, in a conventional robot charging solution, a laser radar device is added on the robot main body, and the position of the charging pile is acquired based on the simultaneous localization and mapping (SLAM) navigation method, and thus realizing robot charging. The solution must add the laser radar device on the robot main body, so the cost is high.

Another conventional robot charging solution takes advantage of wireless techniques such as Bluetooth, wireless network and ultra wide band, establishes a plurality of base stations indoors, and realizes robot charging by triangulation localization method. The solution must establish a plurality of base stations indoors, so the cost is high and the practicability is poor.

In still another conventional robot charging solution, magnetic strips are provided on the indoor floor, and a magnetic sensor is provided on the robot main body, so that the robot main body can move along the magnetic strip and be smoothly navigated to the charging pile. The solution requires the user to remodel the house, and the practicability is poor.

SUMMARY

In order to solve the problems of the conventional robot navigation charging solutions of high cost and poor practicability, the present disclosure provides a method and device for charging a service robot and a service robot.

An embodiment of the present disclosure provides a method for charging a service robot, comprising:
collecting an audio signal generated by a sound source of a charging pile;
determining a direction of the sound source according to the collected audio signal;
controlling a robot main body to move toward the direction of the sound source, to shorten a distance between the robot main body and the charging pile;
judging whether an infrared receiver array on the robot main body has received an infrared pulse signal emitted by an infrared emitter array of the charging pile; and
when the infrared receiver array has received the infrared pulse signal, controlling the robot main body to move toward a direction of the charging pile according to the infrared pulse signal, to engage a charging component of the robot main body with a charging contact element of the charging pile.

Another embodiment of the present disclosure provides a service robot, comprising: an audio signal collector, a processor and an infrared receiver array, wherein the audio signal collector and the infrared receiver array are connected to the processor respectively;
the audio signal collector is configured to collect an audio signal generated by a sound source of a charging pile, and send the audio signal to the processor;
the infrared receiver array is configured to receive an infrared pulse signal emitted by an infrared emitter array of the charging pile, and send the infrared pulse signal to the processor; and
the processor is configured to:
determine a direction of the sound source according to the audio signal collected by the audio signal collector;
control a robot main body to move toward the direction of the sound source, to shorten a distance between the robot main body and the charging pile;
judge whether the infrared receiver array has received an infrared pulse signal emitted by the infrared emitter array of the charging pile; and
when the infrared receiver array has received the infrared pulse signal, control the robot main body to move toward a direction of the charging pile according to the infrared pulse signal, to engage a charging component of the robot main body with a charging contact element of the charging pile.

Still another embodiment of the present disclosure provides a device for charging a service robot comprising a machine-readable storage medium and a processor that are communicatively connected by an internal bus, the machine-readable storage medium stores a computer program executable by the processor, and when executed by the processor the computer program implements the above charging method.

The advantageous effects of the present disclosure are as follows. According to the embodiment of the present disclosure, an audio emitting device (sound source) is provided at the position of the charging pile. The robot main body collects the audio signal generated by the sound source of the charging pile, determines the approximate direction of the charging pile by means of sound source localization, and controls the robot main body to move toward the direction of the sound source where the charging pile is located, to shorten the distance between the robot main body and the charging pile, which can realize long-distance localization navigation, and is not affected by obstacles in the way. The infrared pulse signal emitted by the infrared emitter array of the charging pile is received by the infrared receiver array, and the robot main body is controlled to move toward the direction of charging pile according to the infrared pulse signal, thereby realizing short-distance accurate localization, and completing the engaging between the charging component of the robot main body and the charging contact element of the charging pile. The present disclosure roughly determines the direction of the charging pile by means of sound source localization first. The audio signal can be reflected and transmitted in space without being blocked by obstacles, so the charging pile is not required to be placed in an open land. Then the present disclosure realizes the accurate localization of the direction of the charging pile by using the infrared pulse signal, which improves the practicability of service robot charging and does not need to add other sensing devices, so the cost is low.

DETAILED DESCRIPTION

In order to solve or partially solve the technical problem proposed in the background art, the inventors of the present application find a way out. Specifically, an audio emitting device (sound source) is provided at the position of the charging pile. The robot main body collects the audio signal generated by the sound source of the charging pile, determines the approximate direction of the charging pile by means of sound source localization, and controls the robot main body to move toward the direction of the sound source where the charging pile is located, to shorten the distance between the robot main body and the charging pile, which can realize long-distance localization navigation, and is not affected by obstacles in the way. The infrared pulse signal emitted by the infrared emitter array of the charging pile is received by the infrared receiver array, and the robot main body is controlled to move toward the direction of charging pile according to the infrared pulse signal, thereby realizing short-distance accurate localization, and complete the engaging between the charging component of the robot main body and the charging contact element of the charging pile. The direction of the charging pile is roughly determined first by means of sound source localization. The audio signal can be reflected and transmitted in space without being blocked by obstacles, so the charging pile is not required to be placed in an open land. Then the accurate localization of the direction of the charging pile is realized by using the infrared pulse signal, which improves the practicability of service robot charging and does not need to add other sensing devices, so the cost is low.

In order to make the objects, technical solutions and advantages of the present disclosure clearer, the embodiments of the present disclosure will be further described below in detail in conjunction with the drawings.

Figure 1:
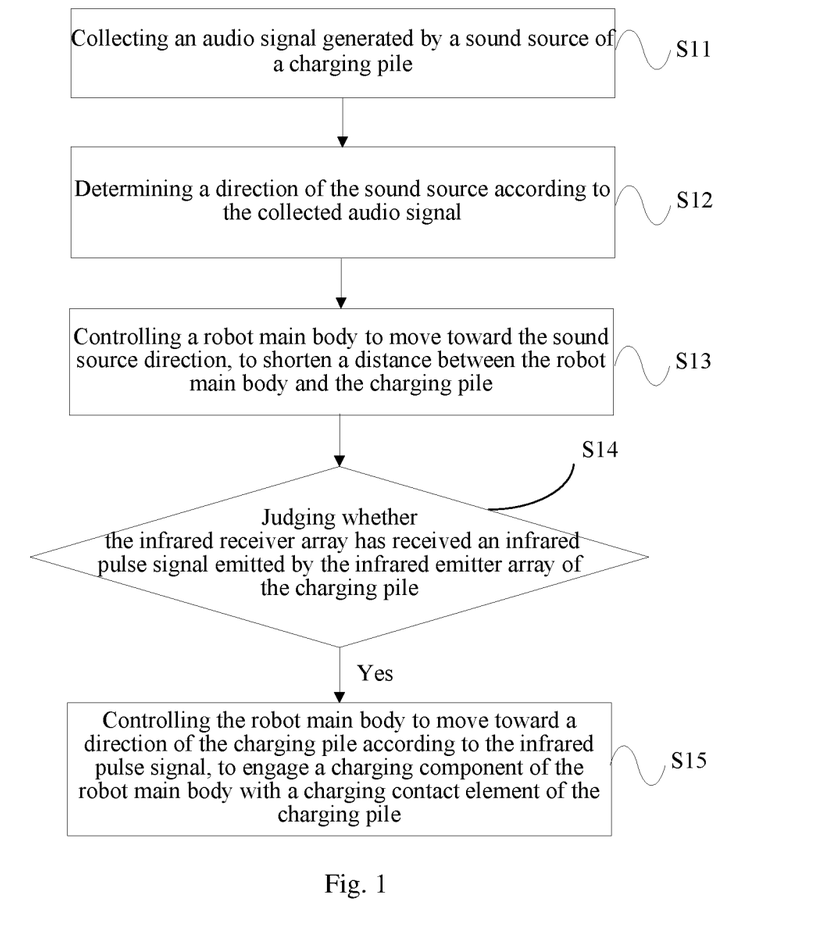
FIG. 1 is a schematic flow diagram of a method for charging a service robot according to an embodiment of the present disclosure.

FIG. 1 is a schematic flow diagram of a method for charging a service robot according to an embodiment of the present disclosure. As shown in FIG. 1, the method for charging a service robot of the present disclosure comprises:

S11: collecting an audio signal generated by a sound source of a charging pile.

It should be noted that, in the embodiment of the present disclosure, the charging pile is provided with an audio emitting device, which works as a sound source and emits outward an audio signal; the robot main body is provided thereon with an audio signal collector for collecting the audio signal generated by the sound source of the charging pile.

S12: determining a direction of the sound source according to the collected audio signal.

S13: controlling a robot main body to move toward the direction of the sound source, to shorten a distance between the robot main body and the charging pile.

S14: judging whether the infrared receiver array has received an infrared pulse signal emitted by an infrared emitter array of the charging pile.

S15: when the infrared receiver array has received the infrared pulse signal, controlling the robot main body to move toward a direction of the charging pile according to the infrared pulse signal, to engage a charging component of the robot main body with a charging contact element of the charging pile.

Understandably, in the embodiment of the present disclosure, the charging pile is provided thereon with an infrared emitter array that emits outward an infrared pulse signal, and the robot main body is provided thereon with an infrared receiver array that receives the infrared pulse signal emitted by the infrared emitter array. When it is determined that the infrared receiver array has received the infrared pulse signal, the direction of the charging pile is determined according to the frequency and the intensity of the infrared pulse signal.

In the method for charging a service robot according to the present disclosure, the audio emitting device is provided at the position of the charging pile. The robot main body collects the audio signal generated by the sound source of the charging pile, determines the approximate direction of the charging pile by means of sound source localization, and controls the robot main body to move toward the direction of the sound source where the charging pile is located, to shorten the distance between the robot main body and the charging pile, which can realize long-distance localization navigation, and is not affected by obstacles in the way. The infrared pulse signal emitted by the infrared emitter array of the charging pile is received by the infrared receiver array, and the robot main body is controlled to move toward the direction of charging pile according to the infrared pulse signal, thereby realizing short-distance accurate localization, and completing the engaging between the charging component of the robot main body and the charging contact element of the charging pile. The direction of the charging pile is roughly determined first by means of sound source localization. The audio signal can be reflected and transmitted in space without being blocked by obstacles, so the charging pile is not required to be placed in an open land. Then the accurate localization of the direction of the charging pile is realized by using the infrared pulse signal, which improves the practicability of service robot charging and does not need to add other sensing devices, so the cost is low.

It should be noted that, the accuracy of the sound source localization is relatively low, and it can only roughly determine the direction of the charging pile according to the direction of the sound source. In order to ensure that the charging component of the robot main body engages with the charging contact element of the charging pile, the direction of the charging pile must be accurately determined according to the infrared pulse signal received by the infrared receiver array, to achieve the engaging between the charging component of the robot main body and the charging contact element of the charging pile. In the embodiment of the present disclosure, the charging component of the robot main body may be a plug of a charger, and the charging contact element of the charging pile may be a charging socket, which is not limited in the present disclosure.

Figure 2:
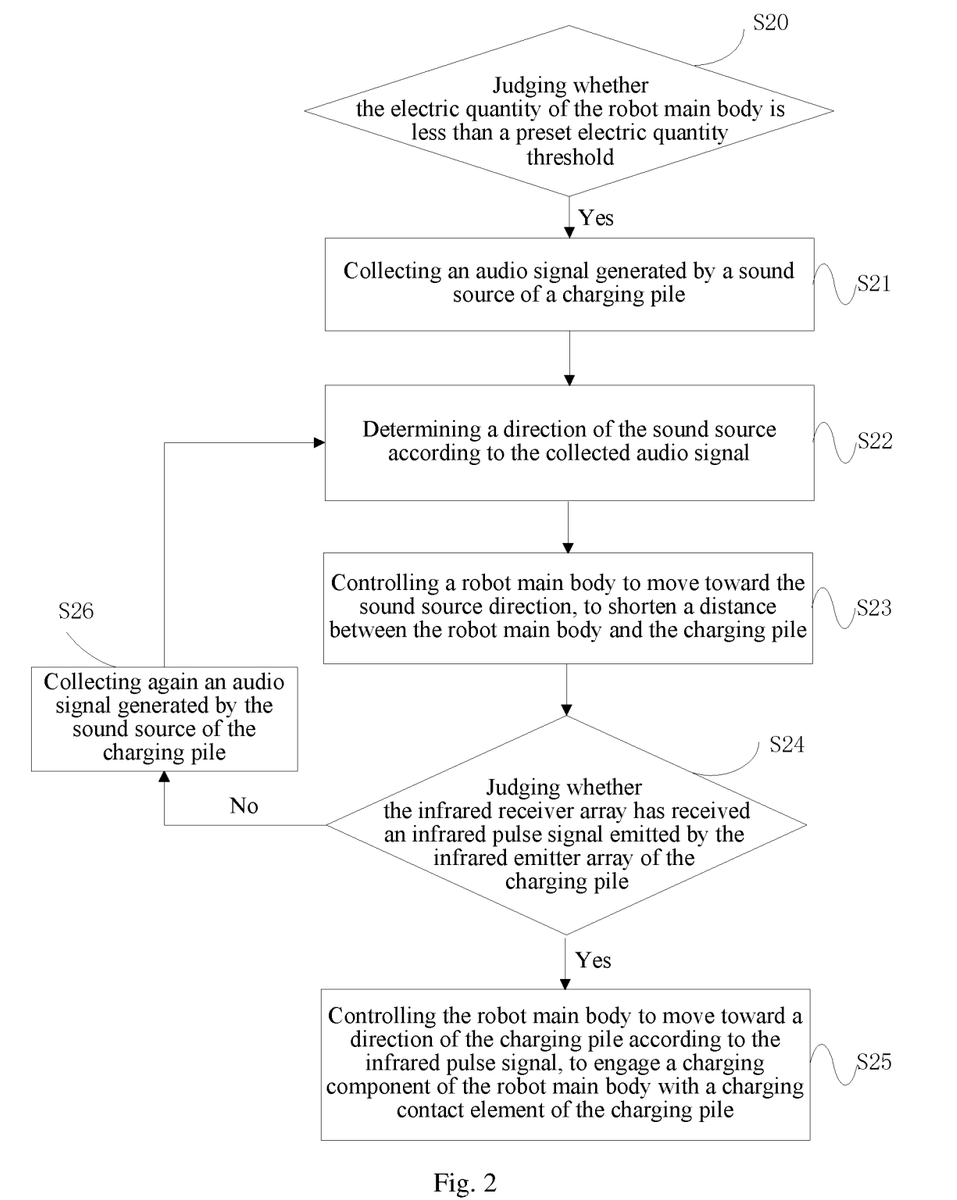
FIG. 2 is a schematic flow diagram of a method for charging a service robot according to another embodiment of the present disclosure.

In an alternative embodiment of the present disclosure, the method shown in FIG. 2 further comprises:

S26: when the infrared receiver array has not received the infrared pulse signal, collecting again an audio signal generated by the sound source of the charging pile, and according to the audio signal determining again the direction of the sound source, and controlling the robot main body to move toward the direction of the sound source.

Understandably, when it is determined that the infrared receiver array has not received the infrared pulse signal, it indicates that the distance between the robot main body and the charging pile needs to be further shortened by sound source localization. Because there are multiple reflections when the sound is travelling in space, the accuracy of sound source localization is relatively low, so the direction localized by sound source localization is merely the direction of the sound source with respect to the position of the robot, and is not necessarily the particular position of the charging pile. Therefore, the movement process of the robot main body will include more than one process of "sound source localization—moving toward the direction of the sound source—sound source localization again—moving again".

In practical applications, in the moving process of the robot main body, it may be judged in real time whether the infrared receiver array has received the infrared pulse signal, and may also be judged when a preset condition is satisfied (for example, every 60 s, that is, after 60 s has passed since the previous judging), which is not limited in the present disclosure.

Steps S22-S25 in FIG. 2 are the same as S12-S15 in FIG. 1, and are not further described here.

In an alternative embodiment, the step of controlling the robot main body to move toward the direction of the sound source comprises: controlling the robot main body to move toward the direction of the sound source by a preset distance, and more specifically, controlling the robot main body to move toward the direction of the sound source by a preset distance with a preset step length.

It should be noted that, in the embodiment of the present disclosure, the robot main body may be controlled to move toward the direction of the sound source by a preset distance according to the distance between the robot main body and the charging pile. Preferably, it may move toward the direction of the sound source by a preset distance with a preset step length according to the distance between the robot main body and the charging pile, to reduce the probability of collision between the robot main body and obstacles, and improve the stability in the moving process.

In practical applications, the preset step length may be set to be 10 cm-20 cm, and the preset distance may be set to be 40 cm-60 cm.

In an embodiment of the present disclosure, the robot main body is provided thereon with a microphone array, and the audio signal generated by the sound source of the charging pile is collected by the microphone array.

It should be noted that, collecting the audio signal by the microphone array is an alternative embodiment, and the present disclosure may also collect the audio signal and realize the localization by other audio signal collectors.

The step of determining a direction of the sound source according to the collected audio signal comprises:

determining intensities of the audio signals collected by respective microphones in the microphone array by using an envelope detector; and determining the direction of the sound source according to the intensities of the audio signals collected by the respective microphones.

In order to alleviate the interference to human ear by the sound emitted by the charging pile, and improve the accuracy of the robot in determining the sound source direction, the frequency of the audio signal generated by the sound source of the charging pile is set to be less than a preset frequency threshold, that is, setting the sound source of the charging pile to generate a low-frequency audio signal. Such a design can also extend the range covered by the acoustic wave of the audio signal, and make the audio signal travel farther.

Before determining intensities of the audio signals collected by respective microphones in the microphone array by using an envelope detector, the method further comprises:

filtering the audio signals collected by the respective microphones in the microphone array by using a low-pass filter.

Correspondingly, the step of determining intensities of the audio signals collected by respective microphones in the microphone array by using an envelope detector comprises:

determining intensities of the respective audio signals that have been filtered by using an envelope detector.

Understandably, in the embodiment of the present disclosure, the sound source of the charging pile generates a low-frequency audio signal, and the audio signal collected by the microphone array is filtered by a low-pass filter, so that only the audio signals whose frequencies are less than the preset frequency threshold are allowed to pass through, and the interference of external sounds (for example, the sounds of a refrigerator, a TV set and so on in a room) can be eliminated. The envelope detector can obtain the intensity of the audio signal more accurately according to the filtered audio signal, thereby determining the direction of the sound source more accurately. In practical applications, the preset frequency threshold may be set to be 50-100 Hz, or employ the low-frequency sound wave of 50 Hz. The human ear is not sensitive to the sounds in this frequency range, so the interference of the audio signal to human ear will be alleviated.

Particularly, the step of determining the direction of the sound source according to the determined intensities of the audio signals collected by the respective microphones comprises:

selecting a first audio signal whose intensity is the greatest and a second audio signal whose intensity is the second greatest from the audio signals collected by the respective microphones; and calculating the direction of the sound source according to the intensities of the first audio signal and the second audio signal.

The calculating of the direction of the sound source will be described in detail by taking a four-microphone array as an example.

The microphone array comprises four microphones, and the four microphones are located on a same circle, and an included angle between each two microphones is 90°. In practical applications, the four microphones are distributed by an interval of 90 degrees at side positions of the robot main body on the same circle.

Figure 3:
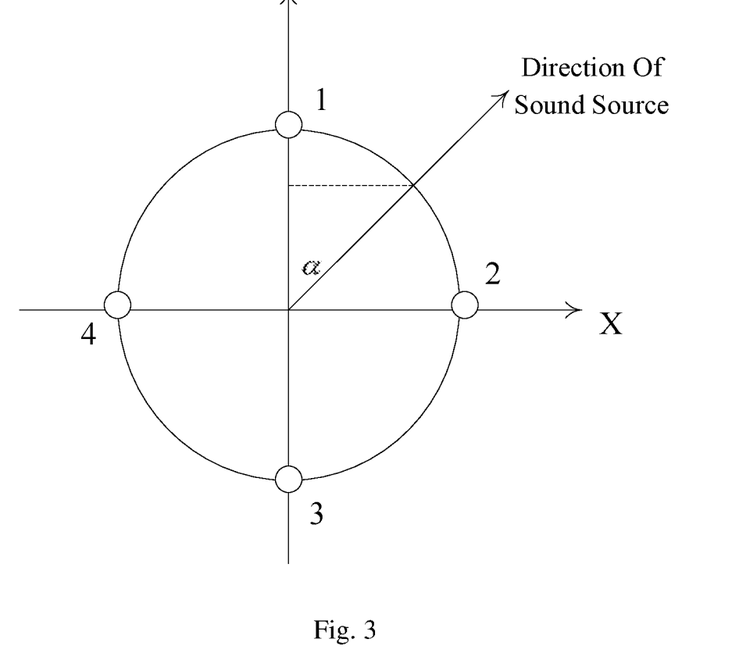
FIG. 3 is a schematic diagram of determining the direction of a sound source according to an embodiment of the present disclosure.

The direction of the sound source is determined according to the following formula:

$$\alpha = \arctan\frac{P2}{P1};$$

wherein, α is the direction of the sound source, P1 is the intensity of the first audio signal, and P2 is the intensity of the second audio signal.

As shown in FIG. 3, in the embodiment of the present disclosure, the microphone array comprises four microphones (1, 2, 3, 4), and the four microphones are located on the same circle, and the included angle between each two microphones is 90°. A rectangular coordinate system is established in the plane formed by the four microphones, with the center point of the circle where the four microphones are located as the origin of coordinates, the connecting line of the microphone 1 and the microphone 3 as the y-axis of the coordinate system, the connecting line of the microphone 2 and the microphone 4 as the x-axis of the coordinate system, and the directions of the microphone 1 and the microphone 2 as the positive axis directions respectively. Assuming that a low-frequency audio signal is transmitted from the sound source direction as shown in FIG. 3, the signal intensities received by the microphone 3 and the microphone 4 are less, and the signal intensities received by the microphone 1 and the microphone 2 are greater. Assuming that the intensity of the audio signal collected by the microphone 1 is the greatest, which corresponds to the signal intensity P1, and the intensity of the audio signal collected by the microphone 2 is the second greatest, which corresponds to the signal intensity P2, the direction a of the sound source may be determined according to the trigonometric relation by using the above formula.

Understandably, the above embodiment is merely a preferable embodiment of the present disclosure, and in practical applications, the number of the microphones in the microphone array is not limited to 4, and may also be other numbers, which is not limited in the present disclosure. In practical applications, the respective microphones in the microphone array may be omnidirectional microphones, which can receive the sounds in various directions with equal quantities and improve the accuracy of the sound source localization.

Further, the step of controlling the robot main body to move toward a direction of the charging pile according to the infrared pulse signal comprises:

receiving an infrared pulse signal emitted by a first infrared emitter of the charging pile by using a first infrared receiver in the infrared receiver array, and receiving an infrared pulse signal emitted by a second infrared emitter of the charging pile by using a second infrared receiver in the infrared receiver array, wherein emission frequencies of the first infrared emitter and the second infrared emitter are different;

determining the direction of the charging pile according to frequencies and intensities of the infrared pulse signals that are received by the first infrared receiver and the second infrared receiver; and controlling the robot main body to move toward the direction of the charging pile according to the direction of the charging pile.

Figure 4:
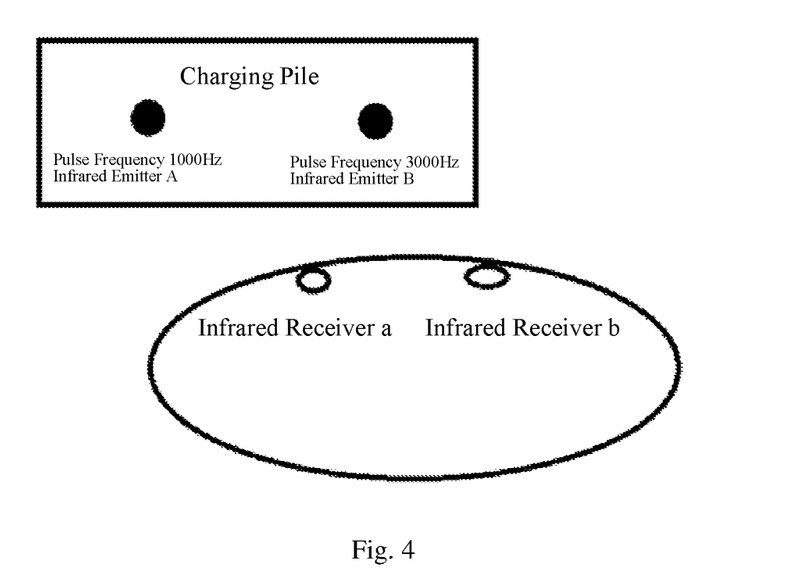
FIG. 4 is a schematic diagram of determining the direction of a charging pile according to an embodiment of the present disclosure.

The particular process of controlling the robot main body to move toward the direction of the charging pile according to the infrared pulse signal in the embodiment of the present disclosure is particularly described below by referring to FIG. 4.

The charging pile is provided with an infrared emitter A and an infrared emitter B. The infrared emitter A and the infrared emitter B may be provided at the surface of the side of the charging pile that is away from the fixing position of the charging pile. For example, if the charging pile is fixed on the wall, the infrared emitter A and the infrared emitter B may be provided at the front face of the charging pile that is away from the wall. The emission frequency of the infrared emitter A is 1000 Hz, and the emission frequency of the infrared emitter B is 3000 Hz. The infrared receiver array of the robot main body comprises an infrared receiver a and an infrared receiver b, which may be provided on the same side of the robot main body and are used to receive infrared pulse signals in space. When the robot is perfectly facing the charging pile and is normally charged, the infrared receiver a receives the infrared pulse signal emitted by the infrared emitter A, and the infrared receiver b receives the infrared pulse signal emitted by the infrared emitter B. If it is determined that the infrared receiver a has received a very strong 3000 Hz infrared pulse signal and a very weak 1000 Hz infrared pulse signal, it indicates that the robot main body is deviated to the right with respect to the position of the charging pile, and the robot main body must move leftward. Similarly, if it is determined that the infrared receiver b has received a very strong 1000 Hz infrared pulse signal and a very weak 3000 Hz infrared pulse signal, it indicates that the robot main body is deviated to the left with respect to the position of the charging pile, and the robot main body must move rightward. The most ideal case is that the robot main body is perfectly facing the charging pile, the infrared receiver a receives a 1000 Hz infrared pulse signal only, and the infrared receiver b receives a 3000 Hz infrared pulse signal only.

In practical applications, the robot main body moves to the position of the charging pile only when it needs to be charged. Thus, in an embodiment of the present disclosure, as shown in FIG. 2, before collecting an audio signal generated by a sound source of a charging pile, the method further comprises:

S20: judging whether the electric quantity of the robot main body is less than a preset electric quantity threshold; and S21: if it is determined that the electric quantity of the robot main body is less than a preset electric quantity threshold, collecting an audio signal generated by the sound source of the charging pile.

In practical applications, the robot main body may judge whether the current electric quantity of the robot is less than the preset electric quantity threshold by an internal voltage detecting circuit, and if it is determined that the electric quantity of the robot main body is less than the preset electric quantity threshold, send an audio playing instruction to the charging pile, to control the audio emitting device of the charging pile to generate an audio signal.

In practical applications, a timer may be provided in the charging pile, and the switch of the audio emitting device is controlled by the timer. The set value of the timer is related to the endurance of the robot main body, and is generally set to be 80% of the endurance. For example, if the endurance of the robot main body is approximately 30 minutes, the timer may be set to be 25 minutes, and when the robot main body has left the charging pile and worked for 25 minutes, the timer controls to turn on the switch of the audio emitting device of the charging pile, so that the audio emitting device generates an audio signal to cause the robot main body to navigate and return.

In order to avoid the noise interference caused by the electrical motor of the robot itself, and improve the accuracy of the sound source direction determining of the robot, in an embodiment of the present disclosure, when the audio signal generated by the sound source of the charging pile is collected, a turning-off instruction is sent to the electrical motor of the robot main body, to control to turn off the electrical motor of the robot main body.

Figure 5:
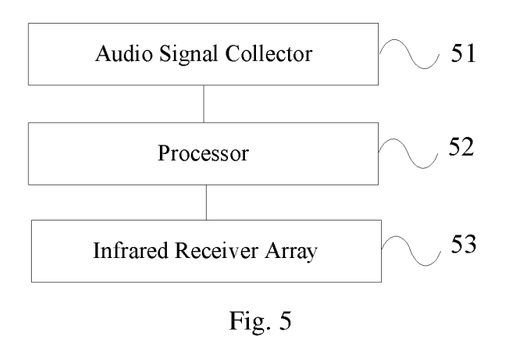
FIG. 5 is a schematic block diagram of a service robot according to an embodiment of the present disclosure.

FIG. 5 is a structural schematic diagram of a service robot according to an embodiment of the present disclosure. As shown in FIG. 5, the service robot in the embodiment of the present disclosure comprises: an audio signal collector 51, a processor 52 and an infrared receiver array 53, and the audio signal collector 51 and the infrared receiver array 53 are connected to the processor 52 respectively.

The audio signal collector 51 is configured to collect an audio signal generated by a sound source of a charging pile, and send the audio signal to the processor 52.

The infrared receiver array 53 is configured to receive an infrared pulse signal emitted by an infrared emitter array of the charging pile, and send the infrared pulse signal to the processor 52.

The processor 52 is configured to:
determine a direction of the sound source according to the audio signal collected by the audio signal collector 51;
control a robot main body to move toward the direction of the sound source, to shorten a distance between the robot main body and the charging pile;
judge whether the infrared receiver array 53 has received an infrared pulse signal emitted by the infrared emitter array of the charging pile; and
when the infrared receiver array 53 has received the infrared pulse signal, control the robot main body to move toward a direction of the charging pile according to the infrared pulse signal, to engage a charging component of the robot main body with a charging contact element of the charging pile.

The service robot according to the present disclosure provides an audio emitting device at the position of the charging pile. The robot main body collects the audio signal generated by the sound source of the charging pile, determines the approximate direction of the charging pile by means of sound source localization, and controls the robot main body to move toward the direction of the sound source where the charging pile is located, to shorten the distance between the robot main body and the charging pile, which can realize long-distance localization navigation, and is not affected by obstacles in the way. The infrared pulse signal emitted by the infrared emitter array of the charging pile is received by the infrared receiver array, and the robot main body is controlled to move toward the direction of charging pile according to the infrared pulse signal, thereby realizing short-distance accurate localization, and completing the accurate engaging between the charging component of the robot main body and the charging contact element of the charging pile. The present disclosure roughly determines the direction of the charging pile by means of sound source localization first. The audio signal can be reflected and transmitted in space without being blocked by obstacles, so the charging pile is not required to be placed in an open land. Then the present disclosure realizes the accurate localization of the direction of the charging pile by using the infrared pulse signal, which improves the practicability of service robot charging, and lowers the cost.

Further, the service robot further comprises an envelope detector connected to the audio signal collector, and the envelope detector is configured to determine intensity of the audio signal collected by the audio signal collector.

The processor 52 is further configured to determine the direction of the sound source according to the intensity of the audio signal.

Preferably, a frequency of the audio signal generated by the sound source of the charging pile is less than a preset frequency threshold; and
the service robot further comprises a low-pass filter provided between the audio signal collector and the envelope detector and configured to filter the audio signal collected by the audio signal collector.

Figure 6:
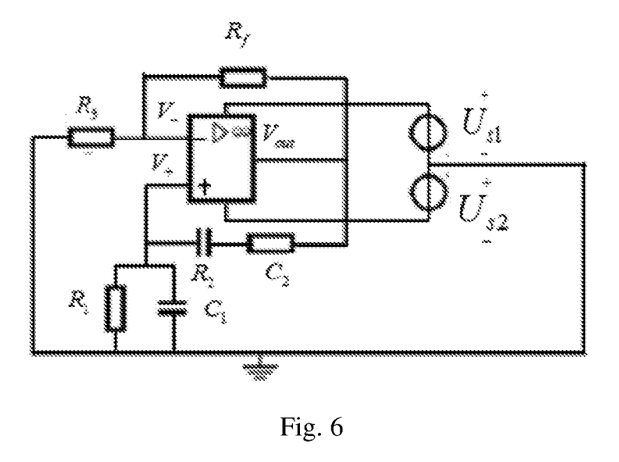
FIG. 6 is a structural schematic diagram of an audio transmitting circuit according to an embodiment of the present disclosure.

In practical applications, the audio emitting device of the charging pile comprises an audio transmitting circuit. In order to generate an audio signal whose frequency is less than the preset frequency threshold, the present disclosure may employ a Wien bridge oscillation circuit whose cost is low. As shown in FIG. 6, the Wien bridge oscillation circuit comprises a positive feedback circuit, a negative feedback circuit and an operational amplifier. The two resistors $R_3$ and $R_f$ are connected in series to form the negative feedback circuit, the negative feedback circuit is connected between the output end $V_{out}$ and the inverted input end V of the operational amplifier, and the function of the negative feedback circuit is to cause the operational amplifier to be subject to self-excitation. A resistor $R_1$ and a capacitor $C_1$ are connected in parallel, a resistor $R_2$ and a capacitor $C_2$ are connected in series, and $R_1$, $C_1$, $R_2$ and $C_2$ form the positive feedback circuit. The positive feedback circuit is connected between the output end $V_{out}$ and the non-inverting input end $V_+$ of the operational amplifier, and its function is filtering and frequency selection to enable the entire oscillation circuit to output the signal of the required frequency.

In an alternative embodiment of the present disclosure, similarly to the service robot in FIG. 5, the processor 52 is further configured to, when the infrared receiver array 53 has not received the infrared pulse signal, collect again an audio signal generated by the sound source of the charging pile, and determine again the direction of the sound source according to the audio signal, and control the robot main body to move toward the direction of the sound source.

To control the robot main body to move toward the direction of the sound source comprises: to control the robot main body to move toward the direction of the sound source by a preset distance with a preset step length.

Particularly, the audio signal collector is a microphone array comprising four microphones, and the four microphones are located on the same circle, and an included angle between each two microphones is 90°;
the processor is further configured to select a first audio signal whose intensity is the greatest and a second audio signal whose intensity is the second greatest from the audio signals collected by the respective microphones; and determine the direction of the sound source according to the following formula:

$$\alpha = \arctan\frac{P2}{P1};$$

wherein, α is the direction of the sound source, P1 is the intensity of the first audio signal, and P2 is the intensity of the second audio signal.

Particularly, the infrared receiver array 53 comprises a first infrared receiver and a second infrared receiver;

the first infrared receiver is configured to receive an infrared pulse signal emitted by a first infrared emitter of the charging pile;

the second infrared receiver is configured to receive an infrared pulse signal emitted by a second infrared emitter of the charging pile;

wherein emission frequencies of the first infrared emitter and the second infrared emitter are different.

The processor is particularly configured to:

determine the direction of the charging pile according to frequencies and intensities of the infrared pulse signals that are received by the first infrared receiver and the second infrared receiver; and control the robot main body to move toward the direction of the charging pile according to the direction of the charging pile.

Figure 7:
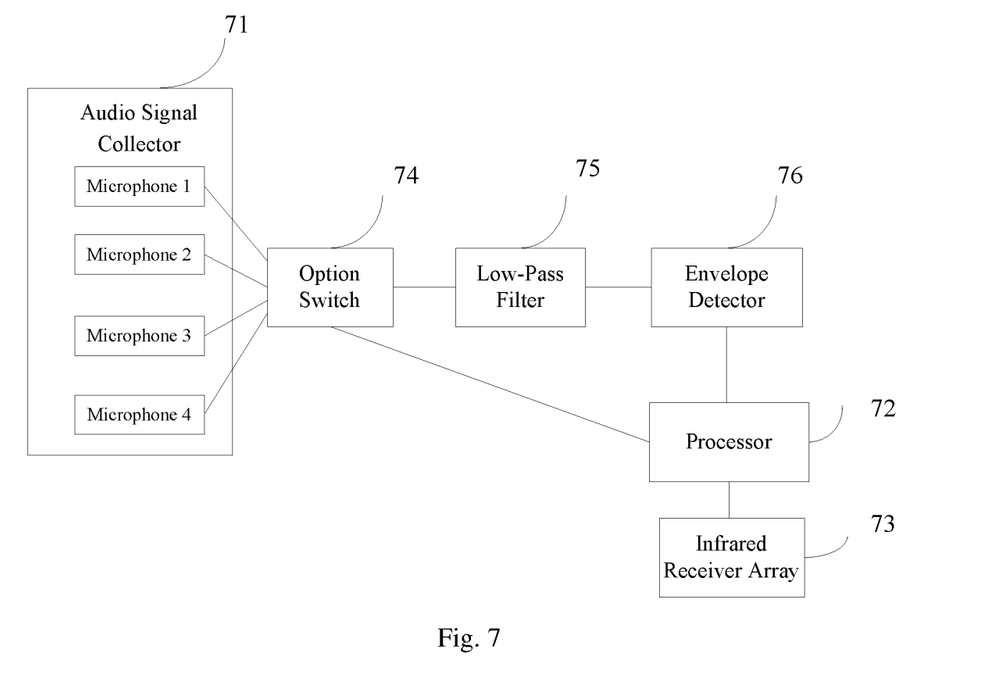
FIG. 7 is a schematic block diagram of a service robot according to another embodiment of the present disclosure.

FIG. 7 is a structural schematic diagram of a service robot of another embodiment of the present disclosure. As shown in FIG. 7, besides an audio signal collector 71, a processor 72 and an infrared receiver array 73, the service robot in the embodiments of the present disclosure further comprises an option switch 74, a low-pass filter 75 and an envelope detector 76 that are sequentially connected.

An input end of the option switch 74 is connected to the audio signal collector 71, an output end of the option switch 74 is connected to the low-pass filter 75, and a control end of the option switch 74 is connected to the processor 72, and the audio signal collected by the audio signal collector 71 passes through the option switch 74 and is processed by the low-pass filter 75.

The low-pass filter 75 is configured to filter the audio signal collected by the audio signal collector 71.

The envelope detector 76 is configured to determine intensity of the audio signal collected by the audio signal collector, and send the intensity of the audio signal to the processor.

The processor 72 is further configured to determine the direction of the sound source according to the intensity of the audio signal.

In practical applications, the audio signal collector 71 comprises a microphone array. Understandably, taking the microphone array comprising four microphones as an example, the processor 72 sends a gating signal to the option switch 74, the option switch 74 selects a certain channel of audio signal from four channels of audio signals collected by the four microphones according to the gating signal to process, and the selected channel of audio signal is inputted to the low-pass filter 75 to be filtered. The option switch 74 selects each channel of audio signals respectively, and the low-pass filter 75 filters the each channel of audio signals respectively.

The low-pass filter 75 filters the audio signals collected by the microphone array, so that only the audio signals whose frequencies are less than the preset frequency threshold are allowed to pass through, and the interference of external sounds (for example, the sounds of a refrigerator, a TV set and so on in a room) can be eliminated. The envelope detector 76 can obtain the intensity of the audio signal more accurately according to the filtered audio signal, so that the processor can determine the direction of the sound source more accurately.

In an alternative embodiment of the present disclosure, because the robot main body moves to the position of the charging pile only when it needs to be charged, the processor is further configured to, before collecting an audio signal generated by a sound source of a charging pile, determine an electric quantity of the robot main body; and correspondingly, the audio signal collector is further configured to, when it is determined that the electric quantity of the robot main body is less than a preset electric quantity threshold, collect an audio signal generated by a sound source of a charging pile.

Further, in order to alleviate the interference to human ear by the sound emitted by the charging pile, and improve the accuracy of the sound source direction determining of the robot, the processor is further configured to, when the audio signal collector is collecting the audio signal generated by the sound source of the charging pile, send a turning-off instruction to the electrical motor of the robot main body, to control to turn off the electrical motor of the robot main body.

It should be noted that, the working process of the service robot of the embodiments of the present disclosure is correspondingly the same as the above embodiments of the method for charging a service robot which have been described in detail above, so it is not further described here.

Figure 8:
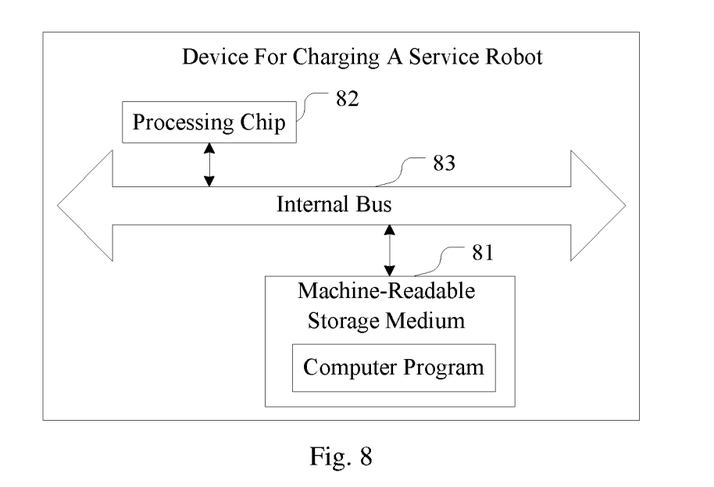
FIG. 8 is a structural schematic diagram of a device for charging a service robot according to an embodiment of the present disclosure.

FIG. 8 is a structural schematic diagram of a device for charging a service robot according to an embodiment of the present disclosure. As shown in FIG. 8, the device comprises a machine-readable storage medium 81 and a processing chip 82 that are communicatively connected by an internal bus 83, the machine-readable storage medium 81 stores a computer program executable by the processing chip 82, and when executed by the processing chip 82 the computer program implements the following steps:

collecting an audio signal generated by a sound source of a charging pile;

determining a direction of the sound source according to the collected audio signal;

controlling a robot main body to move toward the direction of the sound source, to shorten a distance between the robot main body and the charging pile;

judging whether the infrared receiver array has received an infrared pulse signal emitted by the infrared emitter array of the charging pile; and when the infrared receiver array has received the infrared pulse signal, controlling the robot main body to move toward a direction of the charging pile according to the infrared pulse signal, to engage a charging component of the robot main body with a charging contact element of the charging pile.

Optionally, the method further comprises:

when the infrared receiver array has not received the infrared pulse signal, collecting again an audio signal generated by the sound source of the charging pile, and determining again the direction of the sound source according to the audio signal, and controlling the robot main body to move toward the direction of the sound source; and the step of controlling the robot main body to move toward the direction of the sound source comprises: controlling the robot main body to move toward the direction of the sound source with a preset step length by a preset distance.

Optionally, the audio signal generated by the sound source of the charging pile is collected by using a microphone array provided on the robot main body; and the step of determining a direction of the sound source according to the collected audio signal comprises:

determining intensities of the audio signals collected by respective microphones in the microphone array by using an envelope detector; and determining the direction of the sound source according to the intensities of the audio signals collected by the respective microphones.

Optionally, a frequency of the audio signal generated by the sound source of the charging pile is less than a preset frequency threshold;

before determining intensities of the audio signals collected by respective microphones in the microphone array by using an envelope detector, the method further comprises:

filtering the audio signals collected by the respective microphones in the microphone array by using a low-pass filter; and correspondingly, the step of determining intensities of the audio signals collected by respective microphones in the microphone array by using an envelope detector comprises:

determining intensities of the respective audio signals that have been filtered by using an envelope detector.

Optionally, the step of determining the direction of the sound source according to the intensities of the audio signals collected by the respective microphones comprises:

selecting a first audio signal whose intensity is the greatest and a second audio signal whose intensity is the second greatest from the audio signals collected by the respective microphones;

wherein the microphone array comprises four microphones, and the four microphones are located on the same circle, and an included angle between each two microphones is 90°; and determining the direction of the sound source according to the following formula:

$$\alpha = \arctan\frac{P2}{P1};$$

wherein, $\alpha$ is the direction of the sound source, P1 is the intensity of the first audio signal, and P2 is the intensity of the second audio signal.

Optionally, the step of controlling the robot main body to move toward a direction of the charging pile according to the infrared pulse signal comprises:

receiving an infrared pulse signal emitted by a first infrared emitter of the charging pile by using a first infrared receiver in the infrared receiver array, and receiving an infrared pulse signal emitted by a second infrared emitter of the charging pile by using a second infrared receiver in the infrared receiver array, wherein emission frequencies of the first infrared emitter and the second infrared emitter are different;

determining the direction of the charging pile according to frequencies and intensities of the infrared pulse signals that are received by the first infrared receiver and the second infrared receiver; and controlling the robot main body to move toward the direction of the charging pile according to the direction of the charging pile.

Optionally, before collecting an audio signal generated by a sound source of a charging pile, the method further comprises:

determining an electric quantity of the robot main body;

if it is determined that the electric quantity of the robot main body is less than a preset electric quantity threshold, collecting an audio signal generated by the sound source of the charging pile; and when collecting the audio signal generated by the sound source of the charging pile, sending a turning-off instruction to the electrical motor of the robot main body, to control to turn off the electrical motor of the robot main body.

In different embodiments, the machine-readable storage medium 81 may be a random access memory or a nonvolatile memory. The nonvolatile memory may be a storage drive (such as hard disk drive), a solid state disk, any type of memory discs (such as optical disc and DVD), or similar storage media, or a combination thereof. The random access memory may be an RAM (Radom Access Memory), a volatile memory, a nonvolatile memory and a flash memory. Further, the nonvolatile memory and the random access memory, as the machine-readable storage medium, can store the computer program executed by the processing chip 82.

In conclusion, according to the technical solutions of the present disclosure, an audio emitting device is provided at the position of the charging pile. The robot main body collects the audio signal generated by the sound source of the charging pile, and controls the robot main body to move toward the direction of the sound source where the charging pile is located by means of sound source localization, to shorten the distance between the robot main body and the charging pile. The infrared pulse signal emitted by the infrared emitter array of the charging pile is received by the infrared receiver array, and the robot main body is controlled to move toward the direction of charging pile according to the infrared pulse signal, and the engaging between the charging component of the robot main body and the charging contact element of the charging pile is completed. The present disclosure roughly determines the direction of the charging pile by means of sound source localization first. The audio signal can be reflected and transmitted in space without being blocked by obstacles, so the charging pile is not required to be placed in an open land. Then the present disclosure realizes the accurate localization of the direction of the charging pile by using the infrared pulse signal, which improves the practicability of service robot charging, and lowers the cost.

What is claimed is:

1. A method for charging a service robot, comprising:
   collecting an audio signal generated by a sound source of a charging pile;
   determining a direction of the sound source according to the collected audio signal;
   controlling a robot main body to move toward the sound source direction, to shorten a distance between the robot main body and the charging pile;
   judging whether an infrared receiver array on the robot main body has received an infrared pulse signal emitted by an infrared emitter array of the charging pile; and
   when the infrared receiver array has received the infrared pulse signal, controlling the robot main body to move toward a direction of the charging pile according to the infrared pulse signal, to engage a charging component of the robot main body with a charging contact element of the charging pile;

wherein the step of controlling the robot main body to move toward a direction of the charging pile according to the infrared pulse signal comprises:

when the robot main body is perfectly facing the charging pile and is normally charged, receiving an infrared pulse signal emitted by a first infrared emitter of the charging pile by using a first infrared receiver in the infrared receiver array, and receiving an infrared pulse signal emitted by a second infrared emitter of the charging pile by using a second infrared receiver in the infrared receiver array, wherein emission frequencies of the first infrared emitter and the second infrared emitter are different, wherein the emission frequency of the first infrared emitter is a first frequency, and the emission frequency of the second infrared emitter is a second frequency;

determining the direction of the charging pile according to frequencies and intensities of the infrared pulse signals that are received by the first infrared receiver and the second infrared receiver; and controlling the robot main body to move toward the direction of the charging pile according to the direction of the charging pile; and the step of determining the direction of the charging pile according to the frequencies and the intensities of the infrared pulse signals that are received by the first infrared receiver and the second infrared receiver comprises:

if it is determined that the first infrared receiver has received a very strong infrared pulse signal of the second frequency and a very weak infrared pulse signal of the first frequency, it indicates that the robot main body is deviated to the second infrared emitter with respect to the position of the charging pile, and the robot main body is required to move in a direction toward the first infrared emitter; and if it is determined that the second infrared receiver has received a very strong infrared pulse signal of the first frequency and a very weak infrared pulse signal of the second frequency, it indicates that the robot main body is deviated to the first infrared emitter with respect to the position of the charging pile, and the robot main body is required to move in a direction toward the second infrared emitter.

2. The method according to claim 1, further comprising:
when the infrared receiver array has not received the infrared pulse signal, collecting again an audio signal generated by the sound source of the charging pile, and determining again the direction of the sound source according to the audio signal, and controlling the robot main body to move toward the direction of the sound source; and the step of controlling the robot main body to move toward the direction of the sound source comprises:
controlling the robot main body to move toward the direction of the sound source by a preset distance with a preset step length.

3. The method according to claim 1, wherein the audio signal generated by the sound source of the charging pile is collected by using a microphone array provided on the robot main body; and the step of determining a direction of the sound source according to the collected audio signal comprises:

determining intensities of the audio signals collected by respective microphones in the microphone array by using an envelope detector; and determining the direction of the sound source according to the intensities of the audio signals collected by the respective microphones.

4. The method according to claim 3, wherein a frequency of the audio signal generated by the sound source of the charging pile is less than a preset frequency threshold; and before determining intensities of the audio signals collected by respective microphones in the microphone array by using an envelope detector, the method further comprises:

filtering the audio signals collected by the respective microphones in the microphone array by using a low-pass filter; and correspondingly, the step of determining intensities of the audio signals collected by respective microphones in the microphone array by using an envelope detector comprises:

determining intensities of the respective audio signals that have been filtered by using an envelope detector.

5. The method according to claim 3, wherein the step of determining the direction of the sound source according to the intensities of the audio signals collected by the respective microphones comprises:

selecting a first audio signal whose intensity is the greatest and a second audio signal whose intensity is the second greatest from the audio signals collected by the respective microphones; and calculating the direction of the sound source according to the intensities of the first audio signal and the second audio signal.

6. The method according to claim 5, wherein the step of collecting the audio signal generated by the sound source of the charging pile by using a microphone array provided on the robot main body comprises:

configuring the microphone array by four microphones, and collecting the audio signal generated by the sound source of the charging pile by using the microphone array; wherein the four microphones are located on a same circle, and an included angle between each two microphones is 90°; and the step of calculating the direction of the sound source according to the intensities of the first audio signal and the second audio signal comprises:

determining the direction of the sound source according to the following formula:

$$\alpha = \arctan\frac{P2}{P1};$$

wherein, $\alpha$ is the direction of the sound source, P1 is the intensity of the first audio signal, and P2 is the intensity of the second audio signal.

7. The method according to claim 1, wherein before collecting an audio signal generated by a sound source of a charging pile, the method further comprises:

determining an electric quantity of the robot main body;

if it is determined that the electric quantity of the robot main body is less than a preset electric quantity threshold, collecting the audio signal generated by the sound source of the charging pile; and when collecting the audio signal generated by the sound source of the charging pile, sending a turning-off instruction to the electrical motor of the robot main body, to control to turn off the electrical motor of the robot main body.

8. A service robot, comprising: an audio signal collector, a processor and an infrared receiver array, wherein the audio signal collector and the infrared receiver array are connected to the processor respectively;

the audio signal collector is configured to collect an audio signal generated by a sound source of a charging pile, and send the audio signal to the processor;

the infrared receiver array is configured to receive an infrared pulse signal emitted by an infrared emitter array of the charging pile, and send the infrared pulse signal to the processor; and the processor is configured to:
  determine a direction of the sound source according to the audio signal collected by the audio signal collector;
control a robot main body to move toward the direction of the sound source, to shorten a distance between the robot main body and the charging pile;
judge whether the infrared receiver array has received the infrared pulse signal emitted by the infrared emitter array of the charging pile; and
when the infrared receiver array has received the infrared pulse signal, controlling the robot main body to move toward a direction of the charging pile according to the infrared pulse signal, to engage a charging component of the robot main body with a charging contact element of the charging pile;
wherein the infrared receiver array comprises a first infrared receiver and a second infrared receiver;
when the robot main body is perfectly facing the charging pile and is normally charged, the first infrared receiver is configured to receive an infrared pulse signal emitted by a first infrared emitter of the charging pile, the second infrared receiver is configured to receive an infrared pulse signal emitted by a second infrared emitter of the charging pile;
wherein emission frequencies of the first infrared emitter and the second infrared emitter are different, the emission frequency of the first infrared emitter is a first frequency, and the emission frequency of the second infrared emitter is a second frequency; and
the processor is particularly configured to:
determine the direction of the charging pile according to frequencies and intensities of the infrared pulse signals that are received by the first infrared receiver and the second infrared receiver; and
control the robot main body to move toward the direction of the charging pile according to the direction of the charging pile; and
the step of determining the direction of the charging pile according to the frequencies and the intensities of the infrared pulse signals that are received by the first infrared receiver and the second infrared receiver comprises:
if it is determined that the first infrared receiver has received a very strong infrared pulse signal of the second frequency and a very weak infrared pulse signal of the first frequency, it indicates that the robot main body is deviated to the second infrared emitter with respect to the position of the charging pile, and the robot main body is required to move in a direction toward the first infrared emitter; and
if it is determined that the second infrared receiver has received a very strong infrared pulse signal of the first frequency and a very weak infrared pulse signal of the second frequency, it indicates that the robot main body is deviated to the first infrared emitter with respect to the position of the charging pile, and the robot main body is required to move in a direction toward the second infrared emitter.

9. The robot according to claim 8, wherein the processor is further configured to:
when the infrared receiver array has not received the infrared pulse signal, collect again an audio signal generated by the sound source of the charging pile, and determine again the direction of the sound source according to the audio signal, and control the robot main body to move toward the direction of the sound source; and
the processor is configured to control a robot main body to move toward the direction of the sound source comprises: to control the robot main body to move toward the direction of the sound source with a preset step length by a preset distance.

10. The robot according to claim 8, wherein the audio signal collector is a microphone array comprising four microphones, and the four microphones are located on the same circle, and an included angle between each two microphones is 90°.

11. The robot according to claim 8, further comprising an option switch, a low-pass filter and an envelope detector that are sequentially connected, wherein
an input end of the option switch is connected to the audio signal collector, an output end of the option switch is connected to the low-pass filter, and a control end of the option switch is connected to the processor; and the audio signal collected by the audio signal collector passes through the option switch and is processed by the low-pass filter;
the low-pass filter is configured to filter the audio signal collected by the audio signal collector;
the envelope detector is configured to determine intensity of the audio signal collected by the audio signal collector, and send the intensity of the audio signal to the processor;
the processor is further configured to determine the direction of the sound source according to the intensity of the audio signal;
the processor is further configured to, before collecting an audio signal generated by a sound source of a charging pile, determine an electric quantity of the robot main body; and
correspondingly, the audio signal collector is further configured to, when it is determined that the electric quantity of the robot main body is less than a preset electric quantity threshold, collect an audio signal generated by a sound source of a charging pile.

12. The robot according to claim 8, wherein
the processor is further configured to, when the audio signal collector is collecting the audio signal generated by the sound source of the charging pile, send a turning-off instruction to the electrical motor of the robot main body, to control to turn off the electrical motor of the robot main body.

13. A device for charging a service robot, comprising a machine-readable storage medium and a processor that are communicatively connected by an internal bus, the machine-readable storage medium stores a computer program executable by the processor, and when executed by the processor the computer program implements the method the steps as following:

collecting an audio signal generated by a sound source of a charging pile;

determining a direction of the sound source according to the collected audio signal;

controlling a robot main body to move toward the sound source direction, to shorten a distance between the robot main body and the charging pile;

judging whether an infrared receiver array on the robot main body has received an infrared pulse signal emitted by an infrared emitter array of the charging pile; and when the infrared receiver array has received the infrared pulse signal, controlling the robot main body to move toward a direction of the charging pile according to the infrared pulse signal, to engage a charging component of the robot main body with a charging contact element of the charging pile;

wherein the step of controlling the robot main body to move toward a direction of the charging pile according to the infrared pulse signal comprises:

when the robot main body is perfectly facing the charging pile and is normally charged, receiving an infrared pulse signal emitted by a first infrared emitter of the charging pile by using a first infrared receiver in the infrared receiver array, and receiving an infrared pulse signal emitted by a second infrared emitter of the charging pile by using a second infrared receiver in the infrared receiver array, wherein emission frequencies of the first infrared emitter and the second infrared emitter are different, wherein the emission frequency of the first infrared emitter is a first frequency, and the emission frequency of the second infrared emitter is a second frequency;

determining the direction of the charging pile according to frequencies and intensities of the infrared pulse signals that are received by the first infrared receiver and the second infrared receiver; and controlling the robot main body to move toward the direction of the charging pile according to the direction of the charging pile; and the step of determining the direction of the charging pile according to the frequencies and the intensities of the infrared pulse signals that are received by the first infrared receiver and the second infrared receiver comprises:

if it is determined that the first infrared receiver has received a very strong infrared pulse signal of the second frequency and a very weak infrared pulse signal of the first frequency, it indicates that the robot main body is deviated to the second infrared emitter with respect to the position of the charging pile, and the robot main body is required to move in a direction toward the first infrared emitter; and if it is determined that the second infrared receiver has received a very strong infrared pulse signal of the first frequency and a very weak infrared pulse signal of the second frequency, it indicates that the robot main body is deviated to the first infrared emitter with respect to the position of the charging pile, and the robot main body is required to move in a direction toward the second infrared emitter.

14. The device according to claim 13, when executed by the processor the computer program further implements the steps:

when the infrared receiver array has not received the infrared pulse signal, collecting again an audio signal generated by the sound source of the charging pile, and determining again the direction of the sound source according to the audio signal, and controlling the robot main body to move toward the direction of the sound source; and the step of controlling the robot main body to move toward the direction of the sound source comprises: controlling the robot main body to move toward the direction of the sound source by a preset distance with a preset step length.

15. The device according to claim 13, wherein the audio signal generated by the sound source of the charging pile is collected by using a microphone array provided on the robot main body; and the step of determining a direction of the sound source according to the collected audio signal comprises:

determining intensities of the audio signals collected by respective microphones in the microphone array by using an envelope detector; and determining the direction of the sound source according to the intensities of the audio signals collected by the respective microphones.

16. The device according to claim 15, wherein the step of determining the direction of the sound source according to the intensities of the audio signals collected by the respective microphones comprises:

selecting a first audio signal whose intensity is the greatest and a second audio signal whose intensity is the second greatest from the audio signals collected by the respective microphones; and calculating the direction of the sound source according to the intensities of the first audio signal and the second audio signal.

17. The device according to claim 16, wherein the step of collecting the audio signal generated by the sound source of the charging pile by using a microphone array provided on the robot main body comprises:

configuring the microphone array by four microphones, and collecting the audio signal generated by the sound source of the charging pile by using the microphone array; wherein the four microphones are located on a same circle, and an included angle between each two microphones is 90°; and the step of calculating the direction of the sound source according to the intensities of the first audio signal and the second audio signal comprises:

determining the direction of the sound source according to the following formula:

$$\alpha = \arctan\frac{P2}{P1};$$

wherein, α is the direction of the sound source, P1 is the intensity of the first audio signal, and P2 is the intensity of the second audio signal.

* * * * *